(12) United States Patent
Hino et al.

(10) Patent No.: US 11,867,983 B2
(45) Date of Patent: Jan. 9, 2024

(54) ELECTRONIC EYEGLASSES

(71) Applicant: Mitsui Chemicals, Inc., Tokyo (JP)

(72) Inventors: Masayoshi Hino, Ehime (JP); Ryuki Kan, Tokyo (JP)

(73) Assignee: Mitsui Chemicals, Inc., Tokyo (JP)

(*) Notice: Subject to any disclaimer, the term of this patent is extended or adjusted under 35 U.S.C. 154(b) by 603 days.

(21) Appl. No.: 16/944,620

(22) Filed: Jul. 31, 2020

(65) Prior Publication Data
US 2020/0363652 A1    Nov. 19, 2020

Related U.S. Application Data

(63) Continuation of application No. 16/062,070, filed as application No. PCT/JP2016/088180 on Dec. 21, 2016, now Pat. No. 10,768,443.

(30) Foreign Application Priority Data

Dec. 22, 2015   (JP) ................. 2015-250326

(51) Int. Cl.
| | |
|---|---|
| G02C 11/00 | (2006.01) |
| G02C 5/16 | (2006.01) |
| G02C 7/06 | (2006.01) |
| G02C 11/02 | (2006.01) |

(Continued)

(52) U.S. Cl.
CPC ............ *G02C 5/16* (2013.01); *G02C 5/143* (2013.01); *G02C 7/06* (2013.01); *G02C 11/02* (2013.01);

(Continued)

(58) Field of Classification Search
CPC . G02C 5/16; G02C 5/143; G02C 7/06; G02C 11/02; G02C 11/10; H01M 50/256;

(Continued)

(56) References Cited

U.S. PATENT DOCUMENTS

| 3,853,393 A | 12/1974 | Fila et al. |
|---|---|---|
| 6,341,710 B1 | 1/2002 | Danielson et al. |

(Continued)

FOREIGN PATENT DOCUMENTS

| DE | 2 246 737 | 4/1974 |
|---|---|---|
| JP | 10-295947 A | 11/1998 |

(Continued)

OTHER PUBLICATIONS

International Search Report issued in International Patent Application No. PCT/JP2016/088180 dated Mar. 28, 2017.

(Continued)

*Primary Examiner* — Tuyen Tra
(74) *Attorney, Agent, or Firm* — Sterne, Kessler, Goldstein & Fox P.L.L.C.

(57) ABSTRACT

Provided are electronic eyeglasses including a power supply unit that is less likely to be unfastened and is easily attachable and detachable. A power supply unit is detachably attached to an accommodating chamber in a distal end portion of a temple. The power supply unit includes, from a front end toward a rear end, an electrical connection terminal; a first housing unit that holds a first battery, and that has a side surface having an arc shape in a plan view; a narrow portion that is connected to the arc-shaped side surface, and that has a side surface narrower than the side surface; and a second housing unit that has a side surface connected to the narrow side surface, and that hold a second battery. The accommodating chamber has a protruding portion that is elastically deformed so as to be fitted to the narrow portion of the power supply unit.

14 Claims, 17 Drawing Sheets

(51) Int. Cl.
*H01M 50/256* (2021.01)
*G02C 5/14* (2006.01)
*H01M 50/216* (2021.01)

(52) U.S. Cl.
CPC ........... *G02C 11/10* (2013.01); *H01M 50/256* (2021.01); *H01M 50/216* (2021.01); *H01M 2220/30* (2013.01)

(58) Field of Classification Search
CPC .............. H01M 50/20; H01M 50/216; H01M 2220/30; Y02E 60/10
USPC ................................................... 351/41, 158
See application file for complete search history.

(56) References Cited

U.S. PATENT DOCUMENTS

| | | |
|---|---|---|
| 9,442,305 B2 | 9/2016 | Blum et al. |
| 2007/0200998 A1 | 8/2007 | Schrimmer et al. |
| 2012/0262667 A1* | 10/2012 | Willey .................... G02C 5/14 351/158 |
| 2014/0231474 A1 | 8/2014 | Sugihara et al. |

FOREIGN PATENT DOCUMENTS

| | | |
|---|---|---|
| JP | 2004-245900 A | 9/2004 |
| JP | 2007-052116 A | 3/2007 |
| JP | 2013-117567 A | 6/2013 |
| JP | 2015-038542 A | 2/2015 |
| WO | WO 2009/098719 A1 | 8/2009 |
| WO | WO 2013/188805 A2 | 12/2013 |
| WO | WO 2015/159862 A1 | 10/2015 |

OTHER PUBLICATIONS

Extended European Search Report issued in European Patent Application No. 16 878 795.0 dated Jul. 18, 2019.

* cited by examiner

FIG. 23
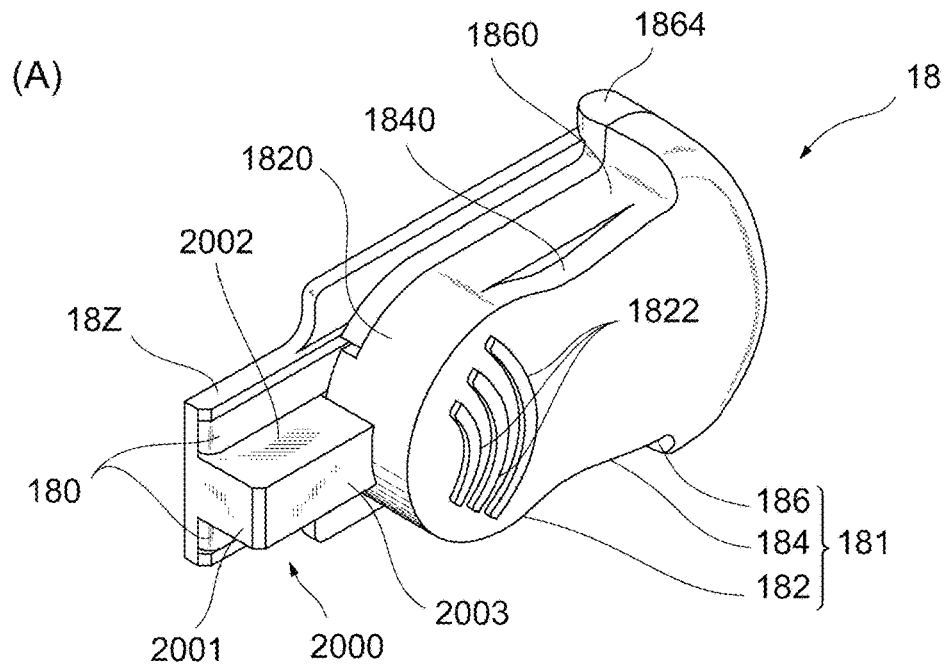
(A)
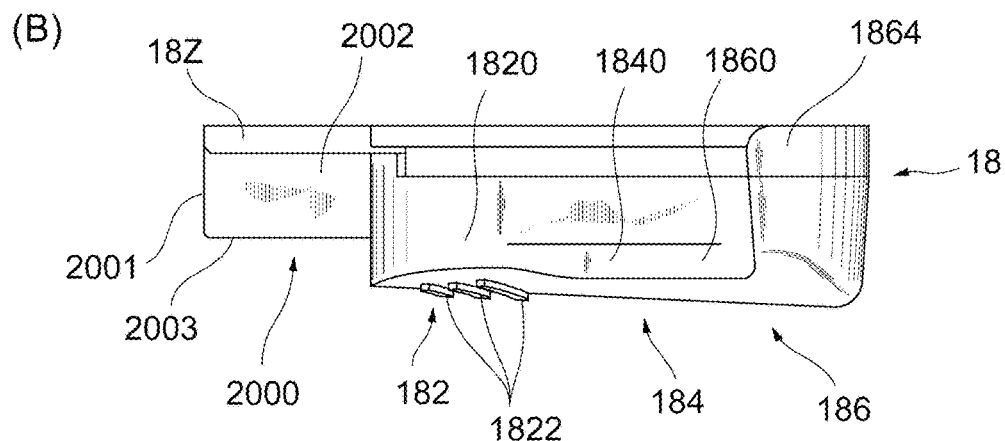
(B)
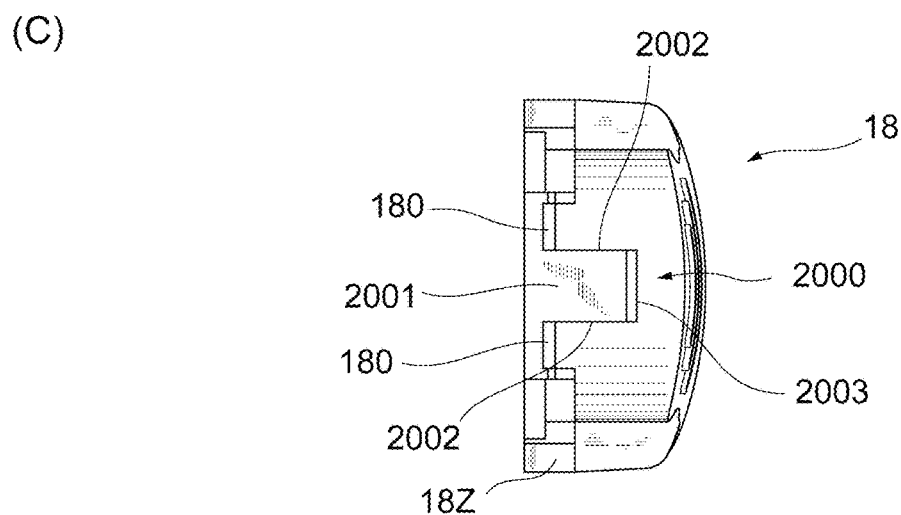
(C)

ELECTRONIC EYEGLASSES

CROSS-REFERENCE

This application is a continuation of U.S. patent application Ser. No. 16/062,070, filed Jun. 13, 2018, which is incorporated herein in its entirety by reference thereto.

BACKGROUND OF THE INVENTION

Technical Field

The present invention relates to electronic eyeglasses.

Background Art

Electronic eyeglasses are usually powered by a small battery. The battery has a limited operation time. Accordingly, a user of the electronic eyeglasses needs to periodically replace or charge the battery. For example, in Patent Documents 1 and 2, it has been proposed to dispose a secondary battery for charging in a distal end of a temple of the electronic eyeglasses.

CITATION LIST

Patent Document 1: Patent Document 1: Japanese Patent Application Laid-Open No. 2004-245900
Patent Document 2: Japanese Patent Application Laid-Open No. 2007-52116

SUMMARY

Technical Problem

However, in the electronic eyeglasses in the related art disclosed in Patent Documents 1 and 2, both batteries are incorporated into a temple of the eyeglasses. Thus, when the battery is charged, the eyeglasses with the battery need to be connected to a power supply terminal disposed in an eyeglasses holder (Patent Document 1: FIG. 7) or a cradle (Patent Document 2: FIG. 7). Therefore, the battery cannot be charged in a state where a user wears the eyeglasses. On the other hand, if a rechargeable battery is disposed in a power supply unit detachable from a main body of the eyeglasses, there is a possibility that the power supply unit may be inadvertently unfastened when the user wears the eyeglasses. However, if the power supply unit is fixed to the main body of the eyeglasses, for example, by using a screw, the power supply unit has to be inconveniently attached to or detached from the main body.

The present invention is made in view of the above-described background, and an object thereof is to provide electronic eyeglasses including a power supply unit which is less likely to be unfastened when in use, and which is easily attachable to and detachable from the electronic eyeglasses.

Means for Solving Problem

According to the present invention, in order to achieve the above-described object, there are provided electronic eyeglasses in which a power supply unit is detachably attached to an accommodating chamber of a distal end portion of a temple. The power supply unit includes, from a front end toward a rear end, an electrical connection terminal; a first housing unit that holds a first battery, and that has a side surface having an arc shape in a plan view; a narrow portion that is connected to the arc-shaped side surface, and that has a side surface narrower than the arc-shaped side surface; and a second housing unit that has a side surface connected to the narrow side surface, and that hold a second battery. The accommodating chamber has a protruding portion that is elastically deformed so as to be fitted to the narrow portion of the power supply unit.

The power supply unit holds total two batteries in the first housing unit and the second housing unit. In a state where batteries are held, the power supply unit is inserted into the accommodating chamber of the temple so that the electrical connection terminal is located forward in an insertion direction. That is, the first housing unit is inserted into the accommodating chamber of the temple so that the first housing unit is located forward in the insertion direction and the second housing unit is located rearward in the insertion direction.

The arc-shaped side surface of the first housing unit is wider than the narrow portion. Accordingly, along with the insertion of the power supply unit, the protruding portion disposed in the accommodating chamber of the temple is spread out and elastically deformed along the side surface of the first housing unit. In this case, the first housing unit has the arc-shaped side surface. Accordingly, the protruding portion is gradually spread out along a shape of the arc-shaped side surface. That is, the protruding portion is not caught on the first housing unit. Moreover, if a portion where the width of the first housing unit is maximized along with the insertion passes across the protruding portion of the accommodating chamber, the protruding portion returns to an original shape by an elastic force, and the first housing unit presses the arc-shaped side surface. In this manner, a pressing force in the insertion direction is applied to the power supply unit. In this manner, the narrow portion of the power supply unit can be more smoothly moved to a fitting position (protruding portion) of the accommodating chamber of the temple.

If the power supply unit is inserted into a fitting position, the protruding portion of the accommodating chamber returns to an original shape thereof by an elastic force, and is fitted to the narrow portion of the housing of the power supply unit. In this manner, the power supply unit is firmly fixed to the accommodating chamber of the temple. If the narrow portion is fitted once to the protruding portion of the accommodating chamber, the power supply unit is not moved in a direction opposite to the insertion direction unless a force of elastically deforming and pushing out the protruding portion of the accommodating chamber is applied, since the arc-shaped side surface of the first housing unit is wider than the narrow portion. Therefore, the power supply unit attached to the accommodating chamber of the temple is not easily unfastened. That is, the power supply unit can be prevented from falling out when the electronic eyeglasses are used.

In addition, when the power supply unit is detached from the accommodating chamber of the temple for the purpose of charging, the power supply unit is moved in a detaching direction (direction opposite to the insertion direction), thereby elastically deforming and pushing out the protruding portion of the accommodating chamber along the side surface of the first housing unit. In this case, the first housing unit has the arc-shaped side surface. Accordingly, the protruding portion is gradually spread out along the shape of the arc-shaped side surface. That is, the protruding portion is not caught on the first housing unit. Therefore, it is possible to smoothly perform an operation for detaching the power supply unit from the temple.

In the present invention, the electronic eyeglasses broadly include eyeglasses which perform some electrical operations and controls for the eyeglasses by receiving power supply. For example, the electronic eyeglasses include eyeglasses which use an electroactive lens as a lens of the eyeglasses so as to change a refractive index of the lens by applying and removing the power, and eyeglasses which are internally equipped with a camera, a sensor, or a communication function and which control the driving of these by receiving the power supply.

In addition, an eyewear according to the present invention is an eyewear where a power supply unit is detachably attached to an accommodating unit of a distal end portion of a temple. The accommodating unit includes a protruding portion which is elastically deformed so as to be fitted to the power supply unit. The power supply unit includes an electrical connection terminal, and a housing unit which accommodates a battery. The housing unit is provided with a narrow portion to which the protruding portion is fitted when the power supply unit is attached to the accommodating unit.

In the eyewear according to the present invention, when the power supply unit is attached to the accommodating unit, the side surface of the housing unit can be covered by the protruding portion. In addition, when the power supply unit is attached to the accommodating unit, the rear surface and the upper surface adjacent to the rear surface of the housing unit of the power supply unit can be exposed in the direction in which the power supply unit is inserted into the accommodating unit, and can form a portion of the surface of the temple. In this case, the upper surface of the housing unit exposed can form a portion of the inner surface of the temple.

In the eyewear according to the present invention, the upper surface of the housing unit may be provided with a recessed portion or a projection portion extending in a width direction.

According to the above-described configuration, the upper surface of the housing unit is provided with the recessed portion or the projection portion extending in the width direction. Accordingly, a user puts his or her finger on the recessed portion or the projection portion so that the power supply unit can be pulled out from the accommodating chamber.

In the eyewear according to the present invention, it is possible to adopt the first housing unit that holds the first battery, and that has the side surface having an arc shape in a plan view, and the second housing unit holds the second battery. In this case, the narrow portion can have the side surface which is connected to the side surface of the first housing unit and which is narrower than the side surface. Then, the thickness of the power supply unit can gradually increase from the first housing unit toward the second housing unit.

According to the above-described configuration, the upper surface of the power supply unit is inclined so that the thickness increases from the first housing unit toward the second housing unit. Therefore, when the power supply unit is detached from the accommodating chamber, the user puts his or her finger on the inclined surface. In this manner, a force is easily applied in the pulling-out direction, and the power supply unit can be more smoothly detached.

In the eyewear according to the present invention, the width of the side surface of the second housing unit can be set to be larger than the width of the side surface of the narrow portion.

According to the above-described configuration, when the power supply unit is attached to the accommodating chamber of the temple, the protruding portion of the accommodating chamber is interposed between the first housing unit and the second housing unit. Accordingly, the power supply unit can be fixed in both the insertion direction and the detaching direction. Therefore, the power supply unit is more reliably held in the accommodating chamber.

In the eyewear according to the present invention, the first battery can be a button battery.

According to the above-described configuration, the first housing unit having the arc shape in a plan view accommodates the button battery having a circular shape in a plan view. Therefore, it is possible to effectively utilize a space in the first housing unit.

In the eyewear according to the present invention, two electrical connection terminals can be disposed at a predetermined interval so as to dispose a projection portion having a predetermined height between the two electrical connection terminals. In this case, the projection portion can extend from the front end of the power supply unit to the front portion of the side surface of the housing unit, and the projection portion can be brought into contact with or fixed to the front portion.

According to the above-described configuration, the projection portion is disposed between the two electrical connection terminals. Accordingly, in a case where a liquid material (for example, user's sweat) accidentally flows into the electrical connection terminals, it is possible to solve a problem of short-circuiting caused by the liquid material conductive between the electrical connection terminals. In addition, the projection portion extends from the front end of the power supply unit to the front portion of the side surface of the housing unit, and the projection portion is brought into contact with or fixed to the front portion. In this manner, it is possible to prevent a gap from being formed between the housing unit and the projection portion, and it is possible to inhibit the liquid material from flowing between the electrical connection terminals.

Advantageous Effects of Invention

According to the present invention, it is possible to provide the electronic eyeglasses including the power supply unit which is easily attachable and detachable and which is less likely to be unfastened when in use.

BRIEF DESCRIPTION OF DRAWINGS

FIG. 23 is a view illustrating a power supply unit according to another embodiment of the present invention: (A) is a perspective view of the power supply unit; (B) is a side view of the power supply unit; and (C) is a front view of the power supply unit.

DESCRIPTION OF EMBODIMENTS

Figure 1:
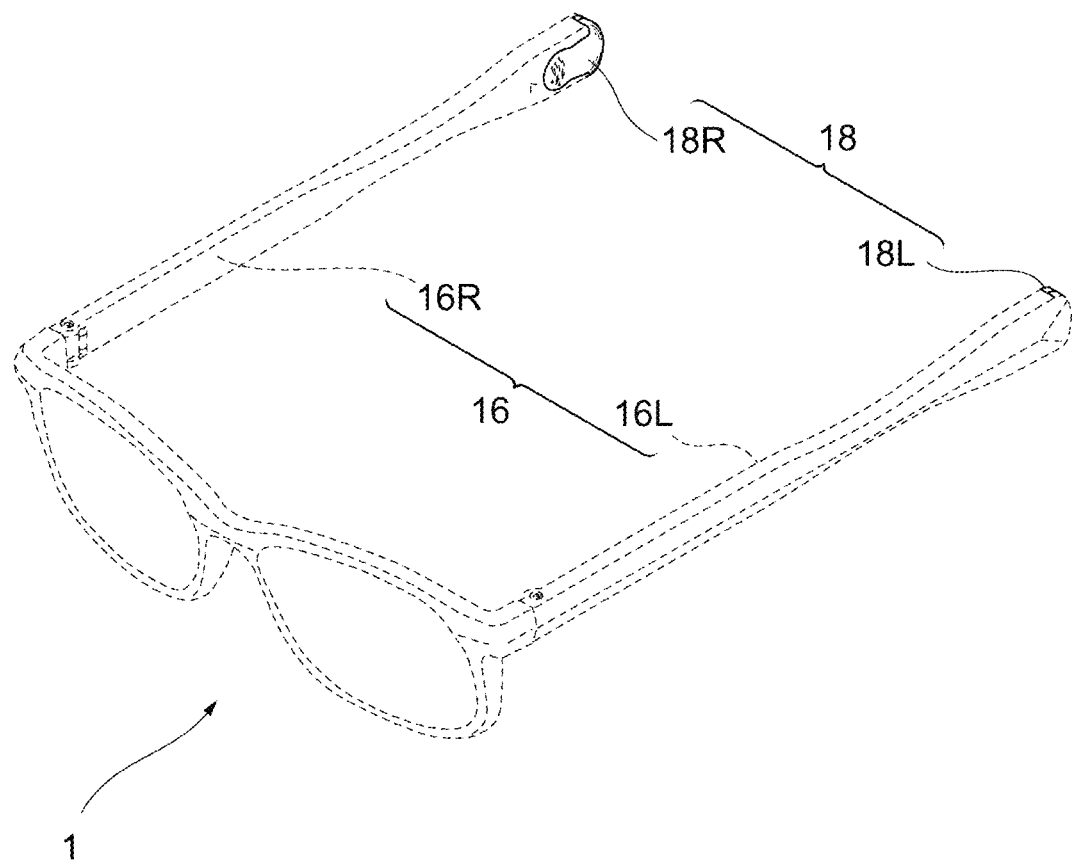
FIG. 1 is a front perspective view of electronic eyeglasses according to an embodiment of the present invention.

Hereinafter, electronic eyeglasses 1 according to preferred embodiments of the present invention will be described with reference to the accompanying drawings. In order to facilitate the understanding of the description, the same reference numerals will be given to the same configuration elements in each drawing as many as possible, and repeated description will be omitted.

(Overall Configuration of Electronic Eyeglasses)

First, an overall configuration of the electronic eyeglasses 1 according to an embodiment of the present invention will be described with reference to FIGS. 1 to 11.

Figure 2:
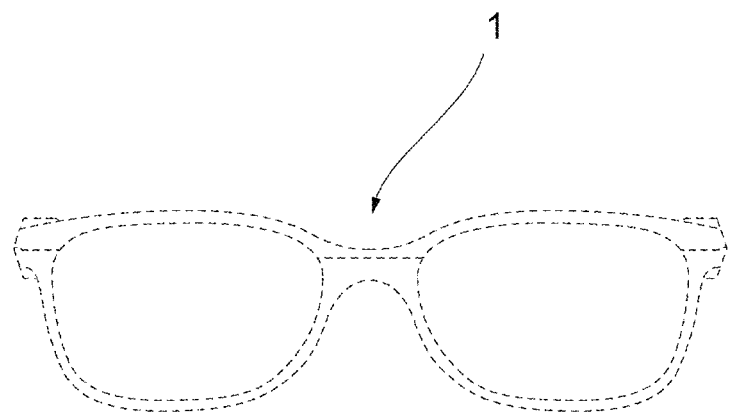
FIG. 2 is a front view of the electronic eyeglasses according to the embodiment of the present invention.
Figure 3:
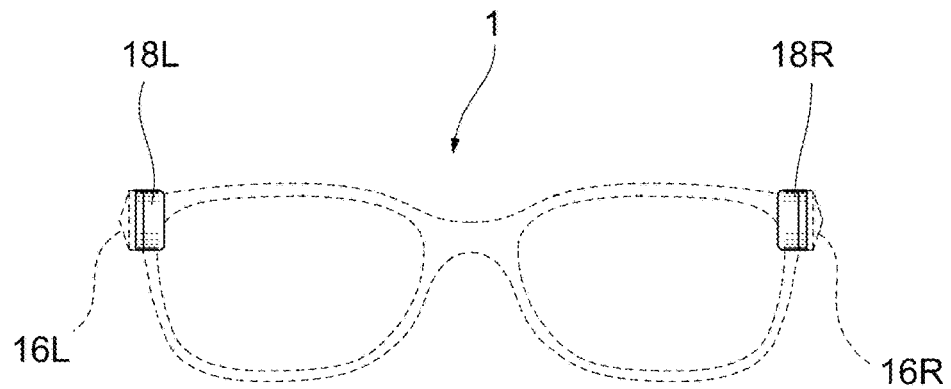
FIG. 3 is a rear view of the electronic eyeglasses according to the embodiment of the present invention.
Figure 4:
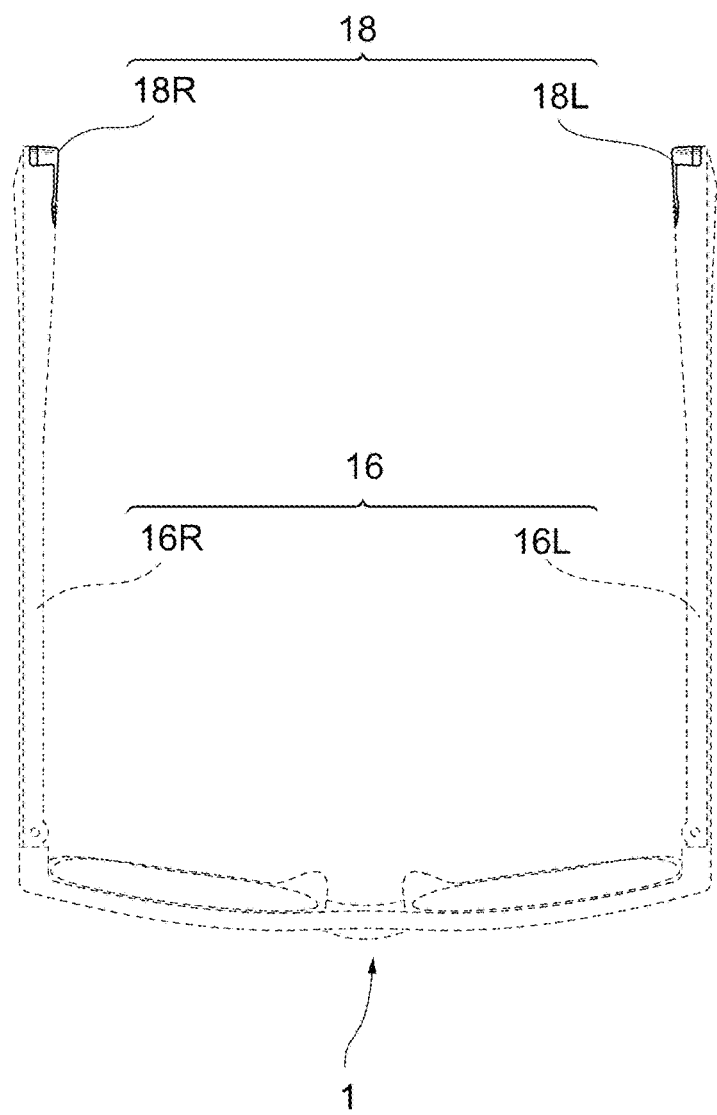
FIG. 4 is a plan view of the electronic eyeglasses according to the embodiment of the present invention.
Figure 5:
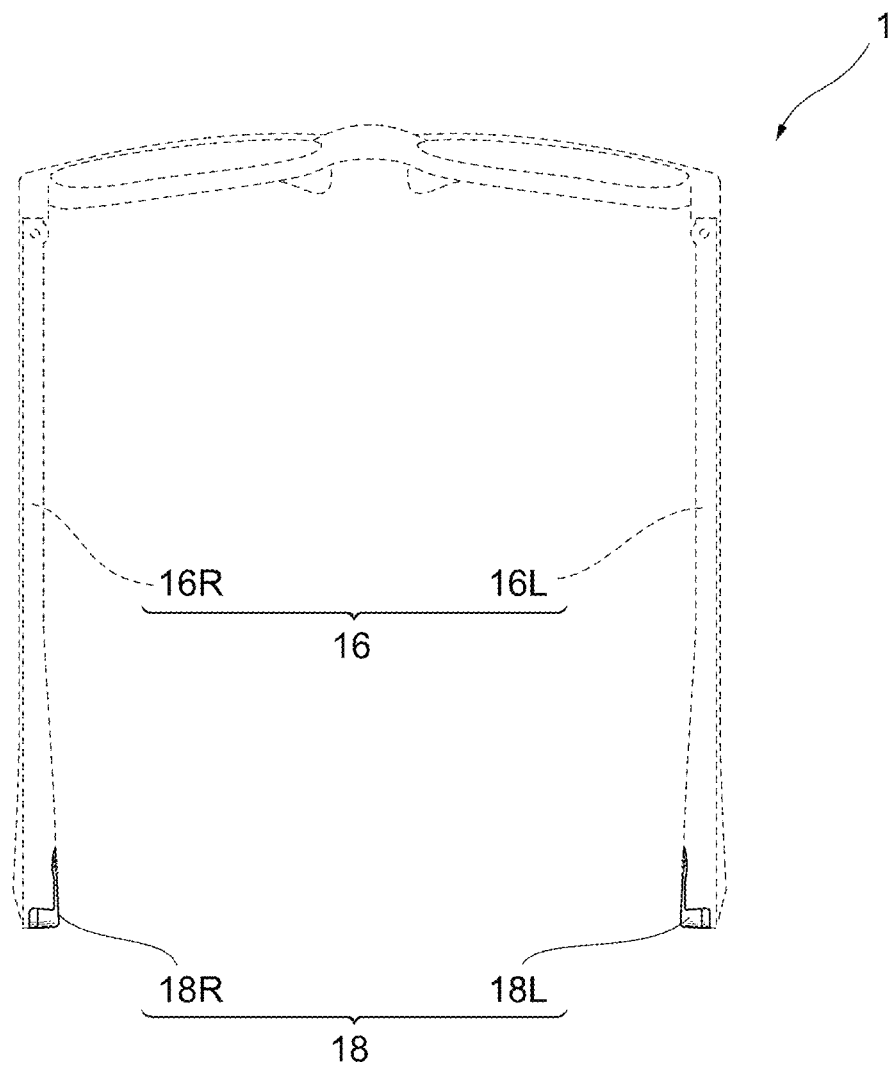
FIG. 5 is a bottom view of the electronic eyeglasses according to the embodiment of the present invention.
Figure 6:
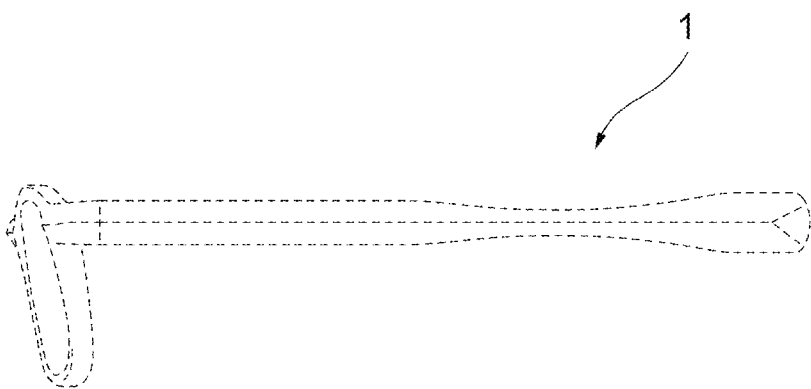
FIG. 6 is a right side view of the electronic eyeglasses according to the embodiment of the present invention.
Figure 7:
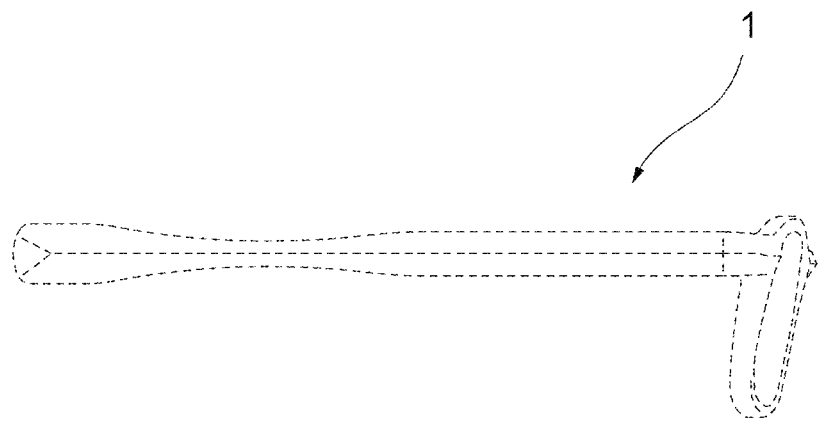
FIG. 7 is a left side view of the electronic eyeglasses according to the embodiment of the present invention.
Figure 8:
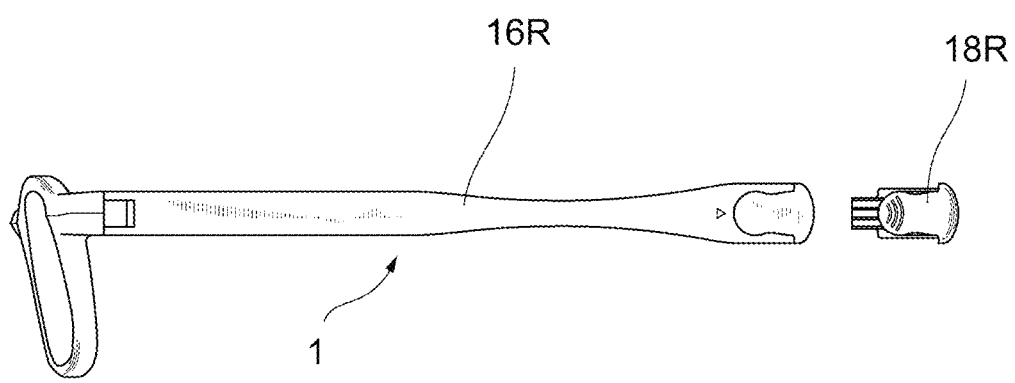
FIG. 8 is a view illustrating a state where a power supply unit of the electronic eyeglasses according to the embodiment of the present invention is detached from a temple.
Figure 9:
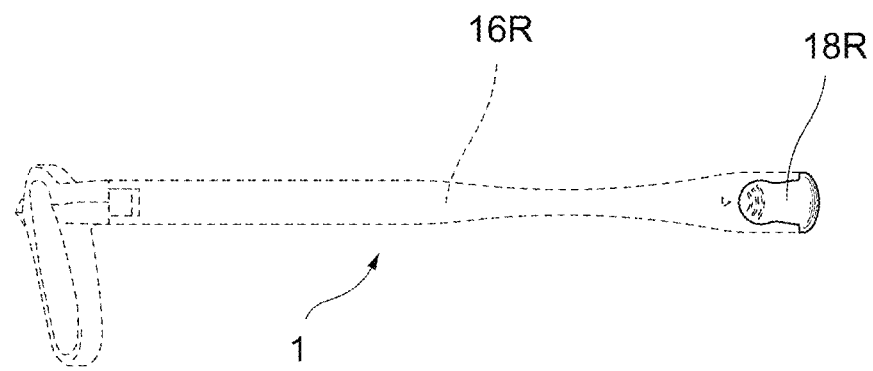
FIG. 9 is a view illustrating a state where the power supply unit of the electronic eyeglasses according to the embodiment of the present invention is attached to the temple.
Figure 10:
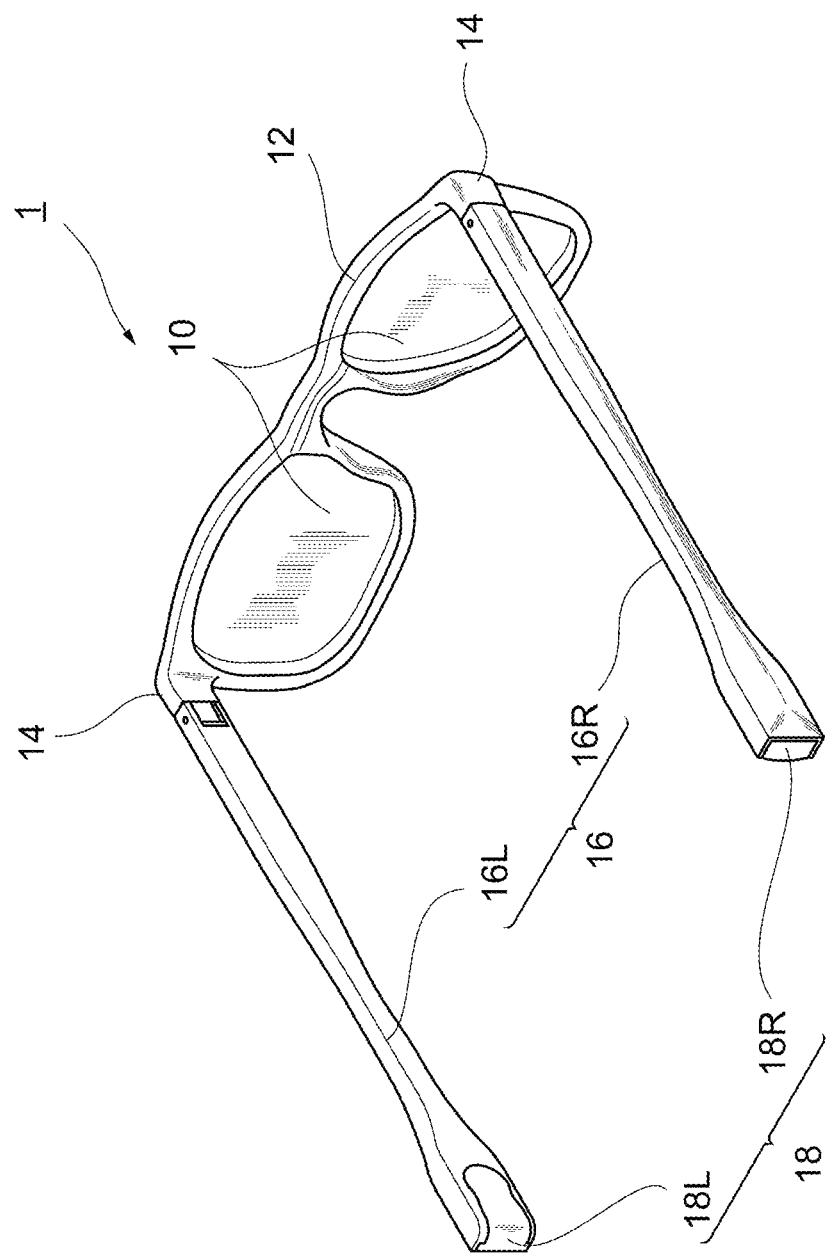
FIG. 10 is a rear perspective view of the electronic eyeglasses according to the embodiment of the present invention.

FIGS. 1 to 7 illustrate the electronic eyeglasses 1 according to the present embodiment. FIG. 1 is a front perspective view, FIG. 2 is a front view, FIG. 3 is a rear view, FIG. 4 is a plan view, FIG. 5 is a bottom view, FIG. 6 is a right side view, and FIG. 7 is a left side view. FIG. 8 is a view illustrating a state where a power supply unit 18 of the electronic eyeglasses 1 according to the present embodiment is detached from a temple 16, and FIG. 9 is a view illustrating a state where the power supply unit 18 of the electronic eyeglasses 1 according to the present embodiment is attached to the temple 16. FIG. 10 is a rear perspective view of the electronic eyeglasses 1 according to the present embodiment, and FIG. 11 is an exploded perspective view for describing an internal configuration of the electronic eyeglasses 1 according to the present embodiment.

As illustrated in FIG. 10, the electronic eyeglasses 1 include: a frame 12 which supports right and left lenses 10; temples 16 (a right temple 16R and a left temple 16L) connected to the frames 12 via a hinge 14; and power supply units 18 (a right power supply unit 18R and s left power supply unit 18L) attached to the temples 16.

The lens 10 is an electroactive lens which adjusts a refractive index of an electroactive material (for example, a liquid crystal material) by applying and removing power. In the present embodiment, as the electroactive lens, a presbyopic lens is used which switches focuses by disposing a crystal liquid lens and an electrode in a progressive multifocus lens and turning on and off the crystal liquid lens by applying and removing the power. That is, the electronic eyeglasses 1 function as the eyeglasses for presbyopia.

Figure 11:
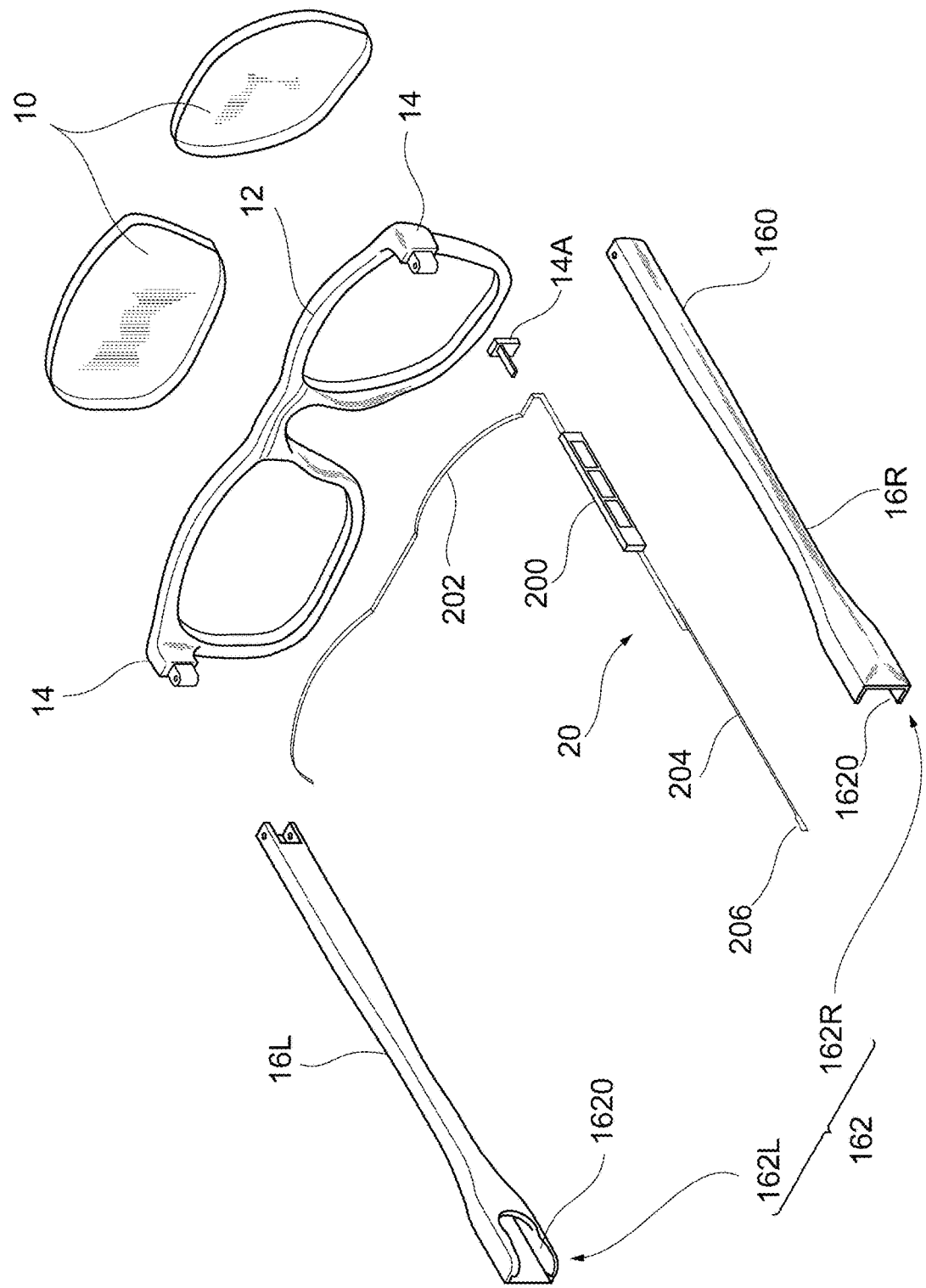
FIG. 11 is an exploded perspective view for describing an internal configuration of the electronic eyeglasses according to the embodiment of the present invention.

As illustrated in FIG. 11, the frame 12 and the right temple 16R internally accommodate an electronic element 20. The electronic element 20 includes a control module 200, conductive flexible cables 202 and 204, and a power supply terminal 206. As illustrated in FIG. 11, the electronic element is not disposed inside the left temple 16L.

The control module 200 includes a capacitance touch sensor (not illustrated), and is disposed so that the capacitance touch sensor faces a contact portion 160 disposed in a portion on an outer surface of the right temple 16R. The control module 200 causes the capacitance touch sensor to detect a user's finger touching the contact portion 160 of the temple, and controls power supply to the lens 10.

The flexible cable 202 extends from the control module 200 through an interior of the hinge 14 and a hinge cover 14A into the frame 12, and is electrically connected to the electrode disposed in the lens 10, thereby transmitting an electric signal from the control module to the lens 10.

The flexible cable 204 extends from the control module 200 toward a distal end portion of the temple, and the power supply terminal 206 is connected to an end portion of the flexible cable 204. The power supply terminal 206 is electrically connectable to the power supply unit 18 (not illustrated in FIG. 11), and transmits the power from the power supply unit 18 to the control module 200.

The temple 16 includes an accommodating chamber (accommodating unit) 162 (a right accommodating chamber 162R and a left accommodating chamber 162L) internally having an accommodating space in a distal end. The accommodating chamber 162 includes a fitting portion 1620 having a fitting surface which conforms to a shape of a side surface of the power supply unit 18 (the right power supply unit 18R and the left power supply unit 18L). The accommodating chamber 162 is formed of an elastic material (for example, plastic), and as the power supply unit 18 is inserted, the fitting portion 1620 is elastically deformed so as to be snap-fitted to the power supply unit 18. In this manner, the power supply unit 18 is firmly attached to the temple 16.

If the right power supply unit 18R is attached to the right accommodating chamber 162R, the right power supply unit 18R is electrically connected to the control module 200 via the power supply terminal 206 and the flexible cable 204 so as to supply the power. That is, the right power supply unit 18R functions as a power source for the electronic eyeglasses 1.

On the other hand, the electronic element is not disposed inside the left temple 16L, and the left power supply unit 18L is electrically insulated even after being attached to the left accommodating chamber 162L. In the present embodiment, the left power supply unit 18L is the same as the right power supply unit 18R. For example, when the right power supply unit 18R is charged, the left power supply unit 18L is attached to the right temple 16R, instead of the right power supply unit 18R, and is used as the power source. That is, the left power supply unit 18L functions as a backup power source for the electronic eyeglasses 1.

(Configuration of Power Supply Unit)

Next, a detailed configuration of the power supply unit 18 (the right power supply unit 18R and the left power supply unit 18L) will be described with reference to FIGS. 12 to 18. As described above, the right power supply unit 18R and the left power supply unit 18L are the same as each other in the present embodiment. Accordingly, hereinafter, both of these will be collectively described as the power supply unit 18.

As illustrated in FIGS. 12 to 15, the power supply unit 18 includes, from a front end to a rear end, an electrical connection terminal 180 a first housing unit 182; a narrow portion 184; and a second housing unit 186. The first housing unit 182, the narrow portion 184, and the second housing unit 186 configure a housing unit 181 which internally accommodates two rechargeable button batteries 188A and 188B (indicated by dotted lines in FIG. 13). For example, the rechargeable button batteries 188A and 188B may be detachable from the housing unit 181 of the power supply unit 18 so as to be replaceable as a single unit. For example, alternatively, the rechargeable button batteries 188A and 188B may not be detachable from the housing unit 181 so that the whole power supply unit 18 is changed during battery exchange.

The electrical connection terminal 180 is formed of a conductive material. The first housing unit 182, the narrow portion 184, and the second housing unit 186 are integrally formed of plastic, for example. In the following description, a direction from the rear end toward the front end of the power supply unit 18 (direction from the second housing unit 186 toward the electrical connection terminal 180) is referred to as a forward direction, and a direction opposite thereto is referred to as a rearward direction.

The electrical connection terminal 180 is electrically connected to the button batteries 188A and 188B accommodated inside the power supply unit 18, and extends forward from the first housing unit 182. The electrical connection terminal 180 is configured to be electrically connected to the power supply terminal 206 when the power supply unit 18 is attached to the right temple 16R.

The first housing unit 182 internally holds the button battery 188A. The first housing unit 182 has a side surface 1820 having an arc shape (more specifically, a fan-like arc shape having a central angle of 180 degrees or larger) in a plan view. The side surface 1820 is formed to conform to a shape of a side surface of the circular button battery 188A, and improves space utilization efficiency inside the first housing unit 182. An upper surface of the first housing unit is provided with three arc-shaped projection portions 1822 extending in a width direction.

Figure 12:
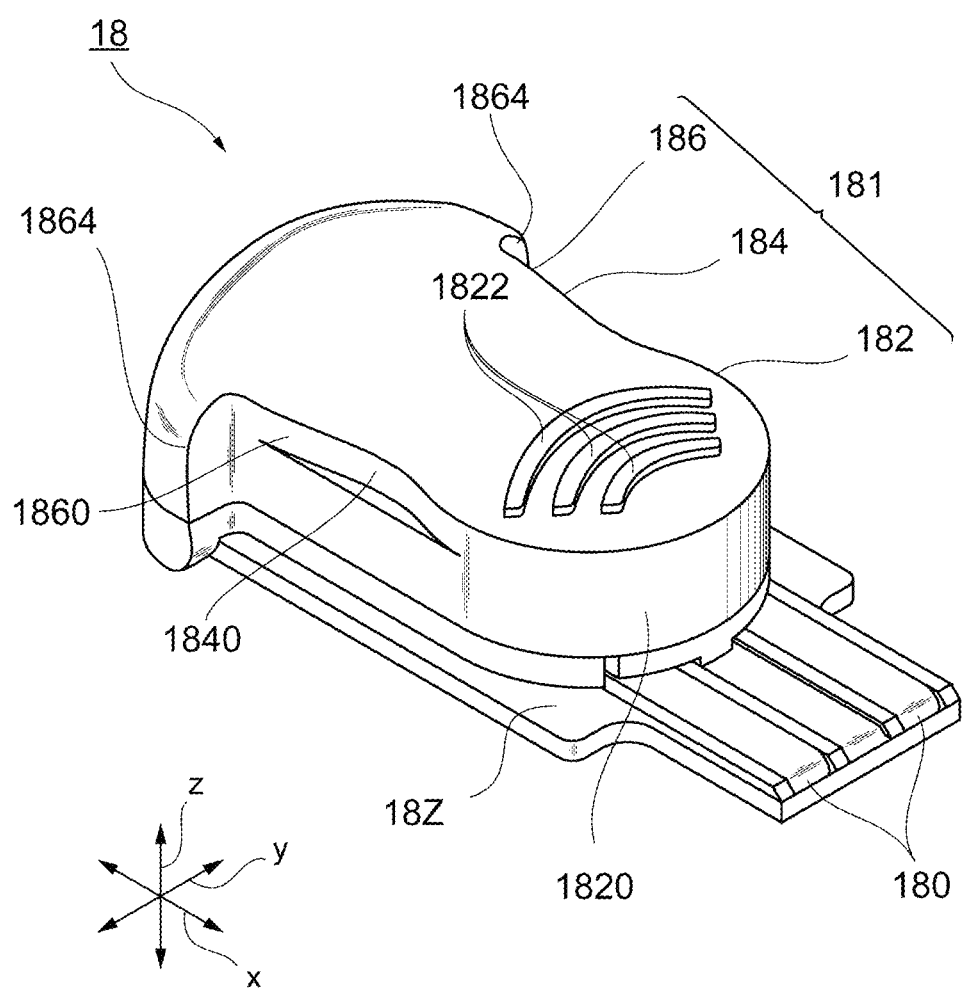
FIG. 12 is a perspective view of the power supply unit of the electronic eyeglasses according to embodiments of the present invention.
Figure 13:
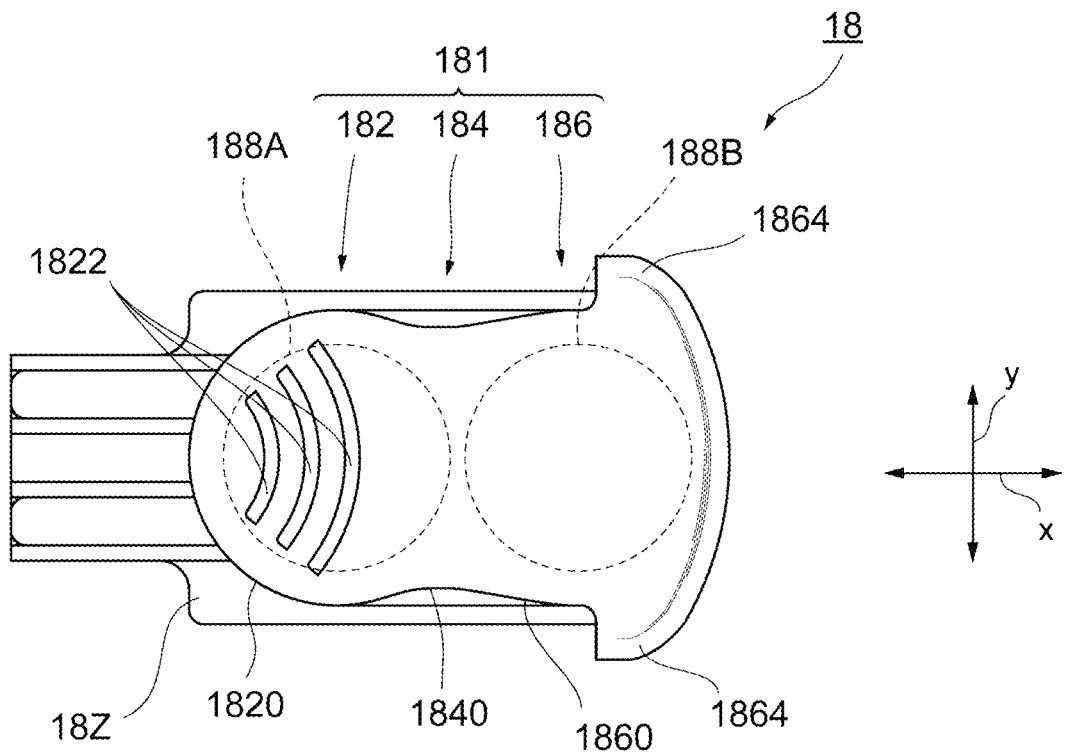
FIG. 13 is a plan view of the power supply unit of the electronic eyeglasses according to the embodiment of the present invention.

As is apparent from FIG. 12, these three arc-shaped projection portions 1822 are disposed to be closed to a front end side on the upper surface of the housing unit 181 of the power supply unit 18 (that is, a side on which the electrical connection terminal 180 is located on the upper surface of the housing unit 181 of the power supply unit 18) in the insertion direction when the power supply unit 18 is inserted into the accommodating chamber 162 of the temple 16. In addition, among the three arc-shaped projection portions 1822, the projection portion 1822 located rearward becomes longer in the width direction. In this manner, the projection portions 1822 can be brought into contact with a relatively large region of a user's finger. Therefore, the power supply unit 18 can be easily pulled out from the accommodating chamber 162.

The narrow portion 184 connects the first housing unit 182 and the second housing unit 186 to each other, and has a narrow side surface 1840 which is smoothly continuous with the side surface 1820 of the first housing unit 182. The side surface 1840 has a narrower width (length in a Y-axis direction in FIGS. 12 and 13) than that of the side surface of the first housing unit 182 and the second housing unit 186.

The second housing unit 186 internally holds the button battery 188B. The second housing unit 186 has a side surface 1860 which is smoothly continuous with side surface 1840 of the narrow portion 184. The side surface 1860 is wider than the side surface 1840, and is gradually widened rearward. In addition, the rear end of the second housing unit is provided with an engaging projection 1864 which projects on both sides in the width direction.

Figure 14:
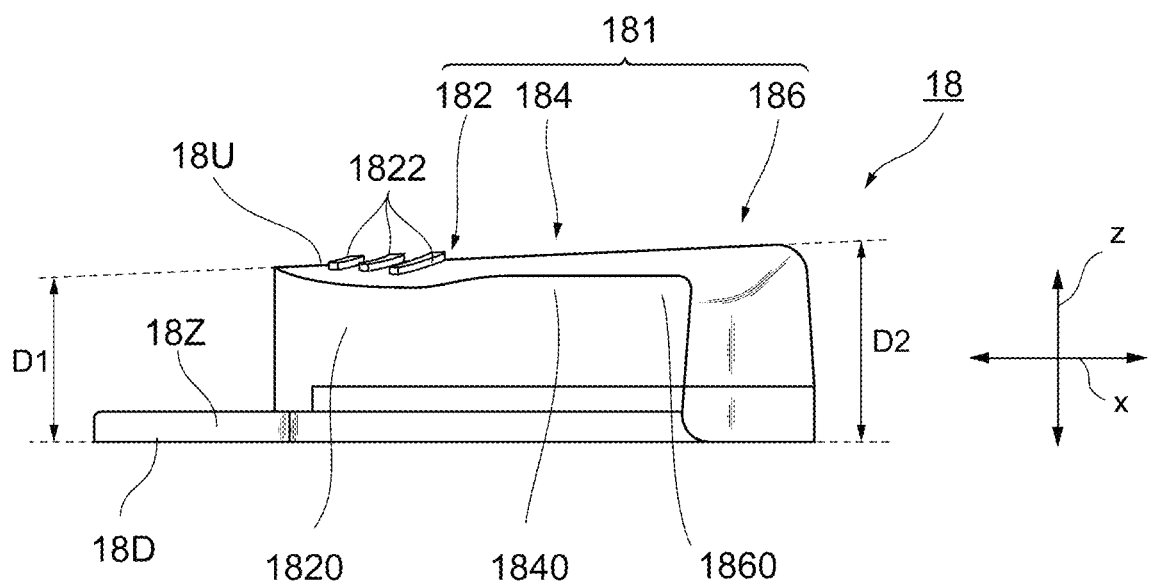
FIG. 14 is a right side view of the power supply unit of the electronic eyeglasses according to the embodiment of the present invention.
Figure 15:
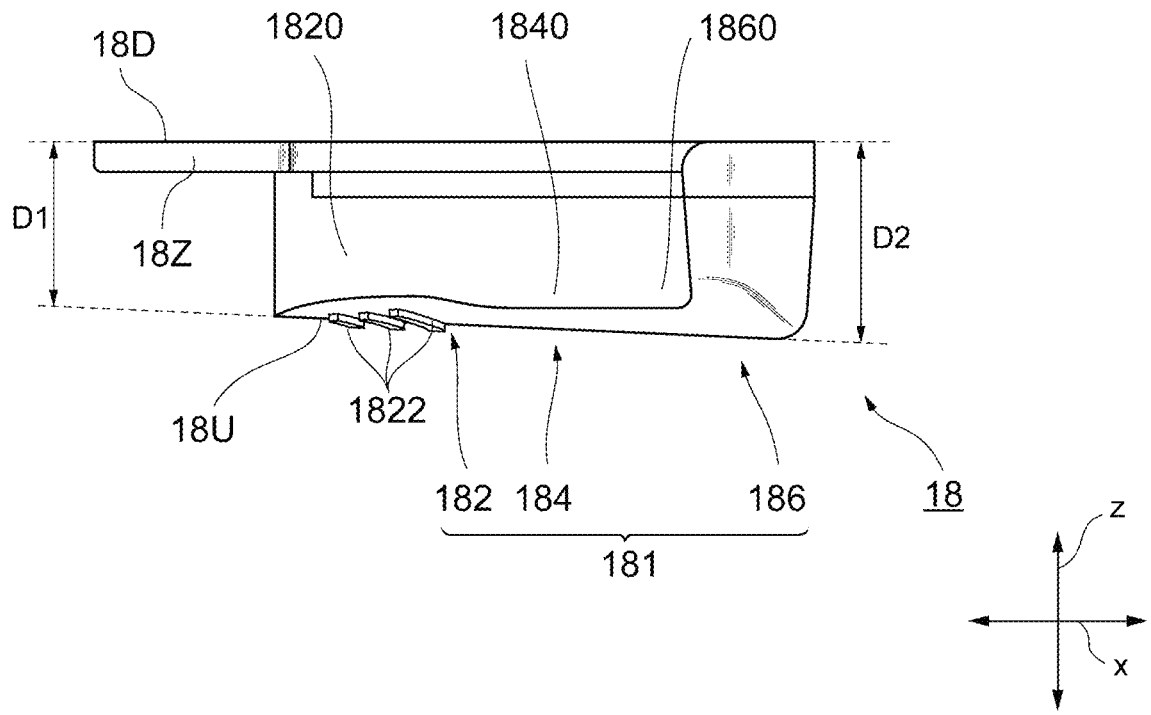
FIG. 15 is a left side view of the power supply unit of the electronic eyeglasses according to the embodiment of the present invention.
Figure 16:
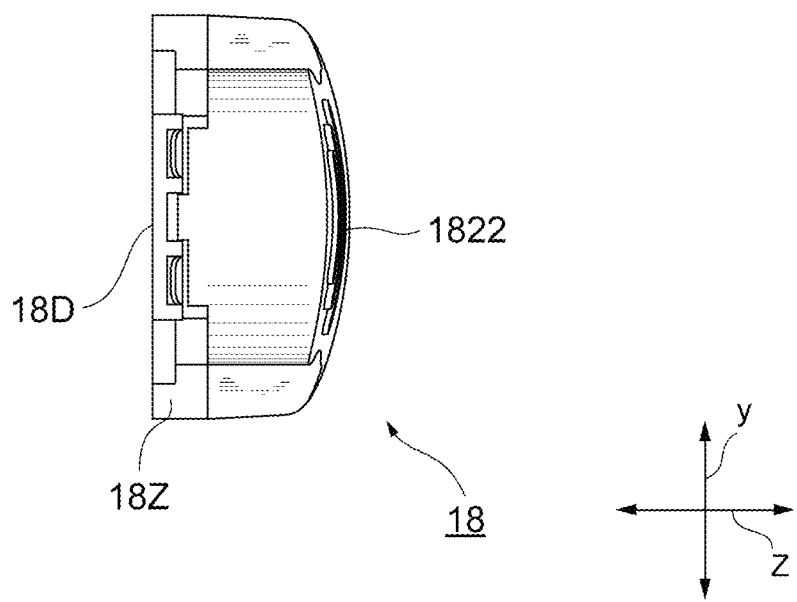
FIG. 16 is a front view of the power supply unit of the electronic eyeglasses according to the embodiment of the present invention.

As illustrated in FIGS. 14 and 15, the thickness (length in a Z-axis direction) of the power supply unit 18 gradually increases from the first housing unit 182 toward the second housing unit 186 (a thickness D2 is thicker than a thickness D1), and an upper surface 18U of the power supply unit 18 configures a gently inclined surface. On the other hand, a lower surface 18D of the power supply unit 18 configures a smooth flat surface.

A color of a flat member 18Z (member including the lower surface 18D) to which the electrical connection terminal 180 of the power supply unit 18 is joined can be set to be different from a color of a main body (temple 16) of the electronic eyeglasses 1 or other plastic members (members configuring the housing unit 181) of the power supply unit 18. For example, the flat member 18Z to which the electrical connection terminal 180 of the power supply unit 18 is joined is colored in a specific color (for example, a chromatic color such as red, orange, yellow, green, blue, and violet colors), and the other members can be colored in a color different from the color of the flat member 18Z (for example, an achromatic color such as black, white, and gray colors). That is, the flat member 18Z and the other members excluding the flat member 18Z of the power supply unit 18 can be colored in mutually different colors. In addition, the flat member 18Z and the other members excluding the flat member 18Z in the main body of the electronic eyeglasses 1 can be colored in mutually different colors.

Figure 17:
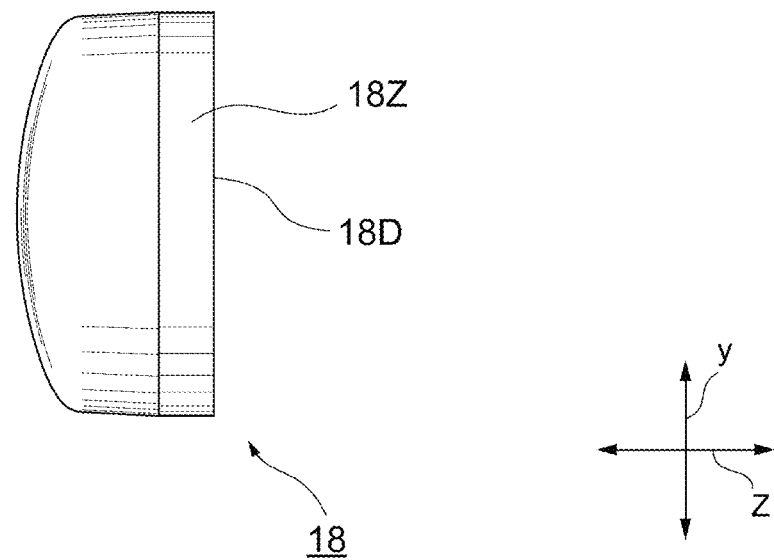
FIG. 17 is a rear view of the power supply unit of the electronic eyeglasses according to the embodiment of the present invention.
Figure 18:
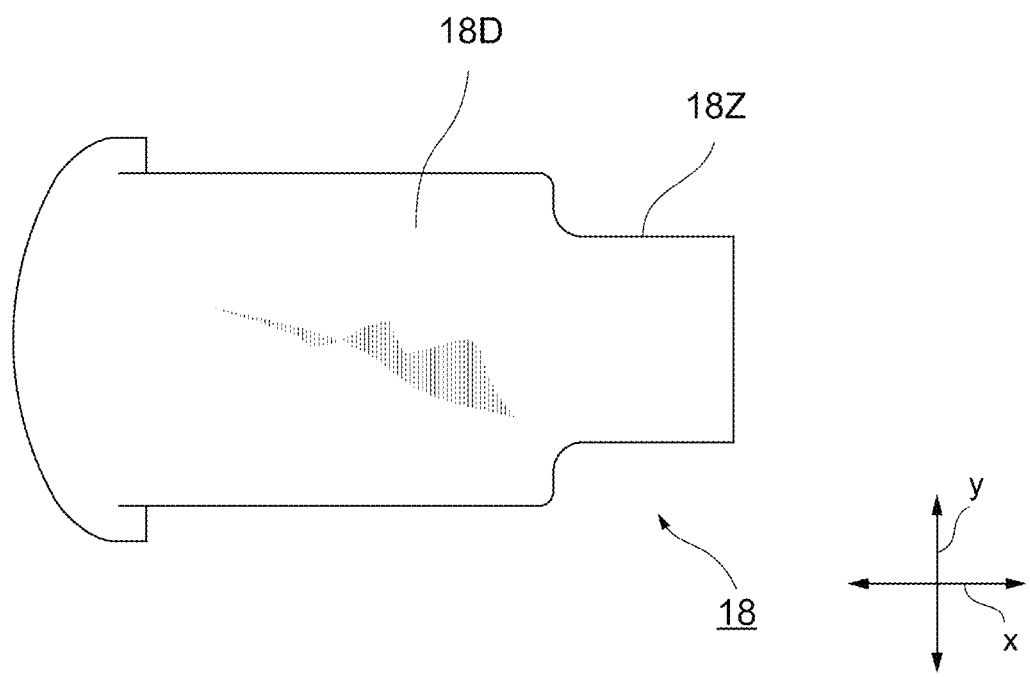
FIG. 18 is a bottom view of the power supply unit of the electronic eyeglasses according to the embodiment of the present invention.

As illustrated in FIG. 18 when the power supply unit 18 is viewed from the bottom surface, a portion of the flat member 18Z is exposed on the entire bottom surface of the power supply unit 18. Accordingly, even if the other members of the power supply unit 18 such as the housing unit 181 are colored in the achromatic color, the flat member 18Z is colored in the specific color such as the chromatic color, so that the power supply unit 18 can be conspicuous as a whole. In addition, as illustrated in FIG. 17 when the power supply unit 18 is viewed from the rear surface, a portion of the flat member 18Z is exposed on the rear surface of the power supply unit 18. Accordingly, even in a state where the power supply unit 18 is attached to the temple 16, the color of the flat member 18Z is in a visible state from the rear of the rear surface of the temple 16. Therefore, in a case of providing a plurality of types of the power supply unit 18, the flat members 18Z are colored in mutually different colors depending on the type of the power supply units 18, so that the type of the power supply units 18 can be easily identified. For example, it is possible to set the color of the flat member 18Z depending on the capacity and charging characteristics of the secondary battery of the power supply unit 18. In addition, in a case where a plurality of types of the main bodies of the electronic eyeglasses 1 is present and a plurality of types of the power supply unit 18 corresponding thereto is present, it is possible to set the color of the flat member 18Z by using an identifier for identifying what type of the main body the power supply unit 18 can be attached to. For example, the respectively corresponding power supply units 18 may be provided depending on uses and functions of the main body of the electronic eyeglasses 1, such as multiple uses for sports, reading, and driving, or multiple functions including a sunglasses function and a focus control function, and the flat member 18Z of the power supply unit 18 may be colored in a different color for each corresponding use or function.

(Method of Attaching and Detaching Power Supply Unit)

Figure 19:
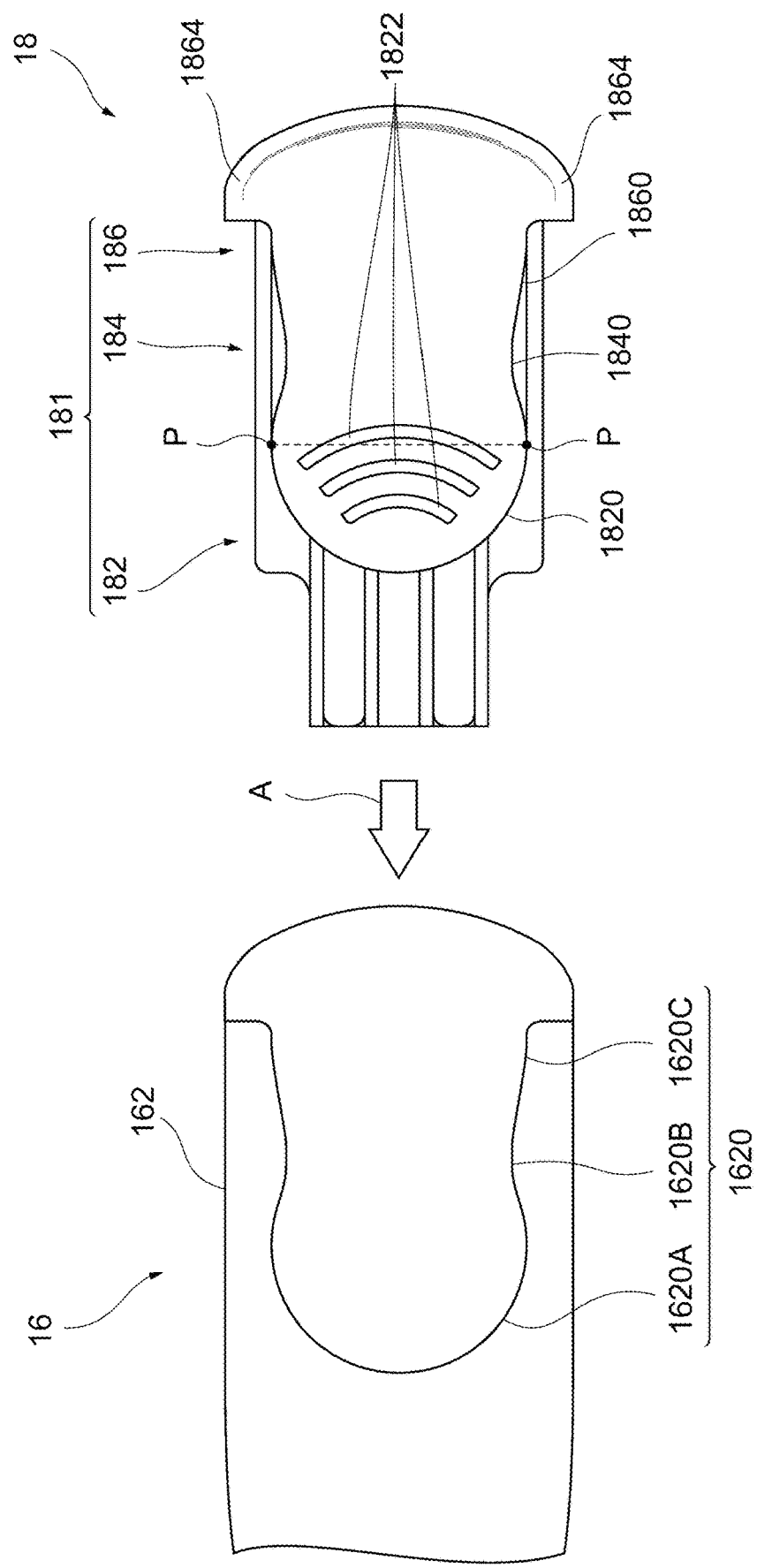
FIG. 19 is a view for describing a method of attaching the power supply unit to the temple of the electronic eyeglasses according to the embodiment of the present invention.

Next, a method of attaching and detaching the power supply unit 18 to and from the temple 16 will be described with reference to FIG. 19. The upper surface of the accommodating chamber 162 of the temple 16 is provided with the fitting portion 1620 conforming to the shape of the side surface of the power supply unit 18. The fitting portion 1620 has a first fitting portion 1620A, a protruding portion 1620B, and a second fitting portion 1620C which respectively conform to the shape of the side surfaces 1820, 1840, and 1860 of the power supply unit 18.

As described above, the accommodating chamber 162 is formed of an elastic material (for example, plastic). As the power supply unit 18 is inserted, the fitting portion 1620 is elastically deformed so as to be snap-fitted to the power supply unit 18.

More specifically, along with the insertion of the power supply unit 18 into the accommodating chamber 162, the protruding portion 1620B of the accommodating chamber 162 is spread out along the side surface 1820 of the first housing unit 182, and is elastically deformed. In this case, the protruding portion 1620B is gradually spread out along the smooth arc-shaped side surface 1820. Accordingly, the protruding portion 1620B is not caught on the first housing unit 182.

If portions P (two points defining the diameter of the first housing unit 182) where the width of the first housing unit 182 is maximized along with the insertion pass across the protruding portion 1620B of the accommodating chamber 162, the protruding portion 1620B tries to return to the original shape by an elastic force, and presses the side surface 1820 of the first housing unit 182. In this manner, a force for pushing the power supply unit 18 in the insertion direction (arrow A in FIG. 19) works.

If the power supply unit 18 is continuously inserted, the protruding portion 1620B of the accommodating chamber 162 returns to the original shape by the elastic force, and is fitted to the side surface 1840 of the narrow portion 184. In this case, the protruding portion 1620B of the accommodating chamber 162 is interposed between the side surface 1820 of the first housing unit 182 and the side surface 1860 of the second housing unit 186. Therefore, the power supply unit 18 is not moved, unless a force of elastically deforming and pushing out the protruding portion 1620B of the fitting portion 1620 is applied. In this manner, the power supply unit 18 attached to the accommodating chamber 162 of the temple 16 is not easily unfastened, and the power supply unit 18 can be prevented from falling out when the electronic eyeglasses 1 are used.

Figure 20:
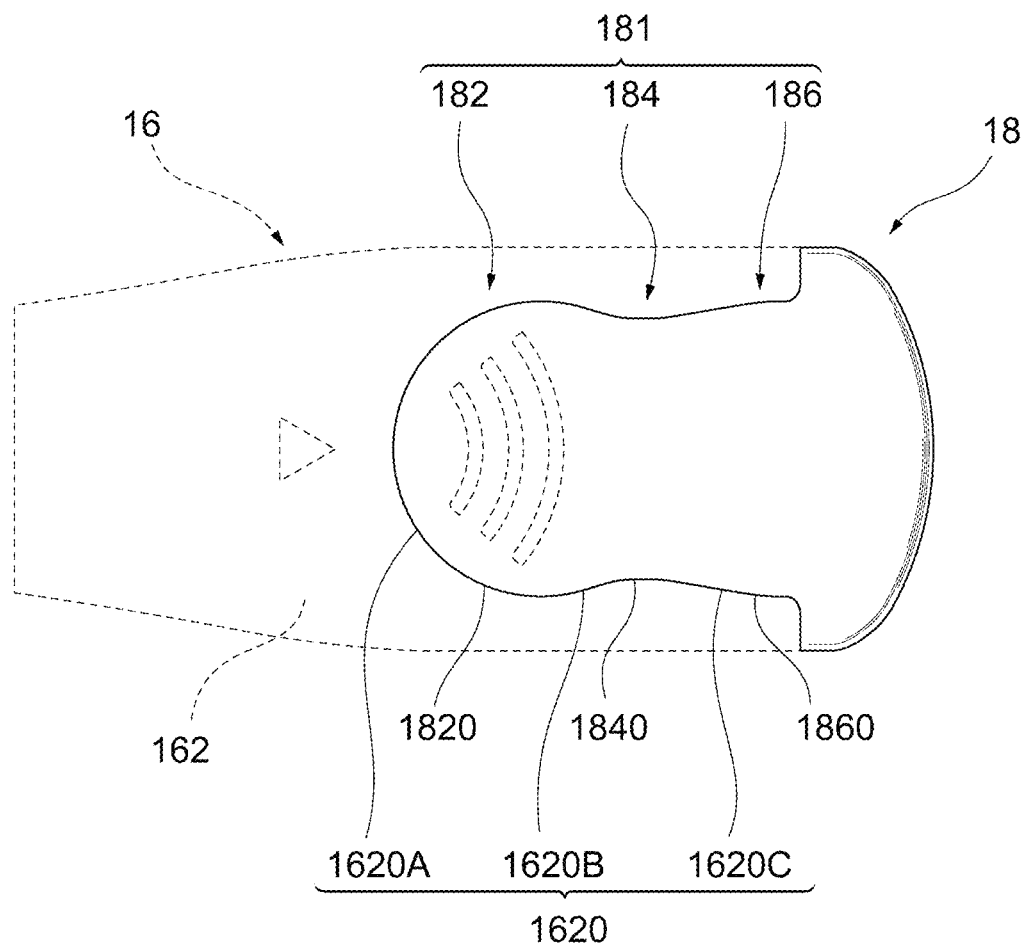
FIG. 20 is an enlarged view illustrating a state where the power supply unit is attached to the temple of the electronic eyeglasses according to the embodiment of the present invention.

In a state where the power supply unit 18 is attached to the accommodating chamber 162 as illustrated in FIG. 20, the side surfaces 1820, 1840, and 1860 of the housing unit 181 of the power supply unit 18 are covered by the fitting portion 1620 (the first fitting portion 1620A, the protruding portion 1620B, and the second fitting portion 1620C) of the accommodating chamber 162, and the rear surface in the direction in which the power supply unit 18 is inserted into the accommodating chamber 162 and the upper surface adjacent to the rear surface of the housing unit 181 of the power supply unit 18 are exposed, thereby forming a portion of the surface of the temple 16. In this way, in a state where the power supply unit 18 is attached to the accommodating chamber 162, the rear surface and the upper surface of the housing unit 181 of the power supply unit 18 form a portion of the surface of the temple 16. In this case, the upper surface of the housing unit 181 forms a portion of the inner surface (surface located on a user's side in a state where the user wears the electronic eyeglasses 1) of the temple 16.

When the power supply unit 18 is detached from the accommodating chamber 162 of the temple 16 for charging, a finger is put on the projection portion 1822 of the upper surface of the first housing unit 182, and the power supply unit 18 is pulled out in a direction opposite to the insertion direction. Here, the upper surface 18U of the power supply unit 18 is inclined so that the thickness increases from the first housing unit 182 toward the second housing unit 186. Therefore, the finger is put on the first housing unit, thereby allowing a force acting in the pulling-out direction to be more easily applied.

If the power supply unit 18 is moved in the direction opposite to the insertion direction, the protruding portion 1620B of the fitting portion 1620 is elastically deformed along the side surface 1820 of the first housing unit 182, and is spread out. In this case, the protruding portion 1620B is gradually spread out along the smooth arc-shaped side surface 1820. Accordingly, the protruding portion 1620B is not caught on the first housing unit 182. Therefore, the operation for detaching the power supply unit 18 can be smoothly performed.

(Method of Charging Power Supply Unit)

Figure 21:
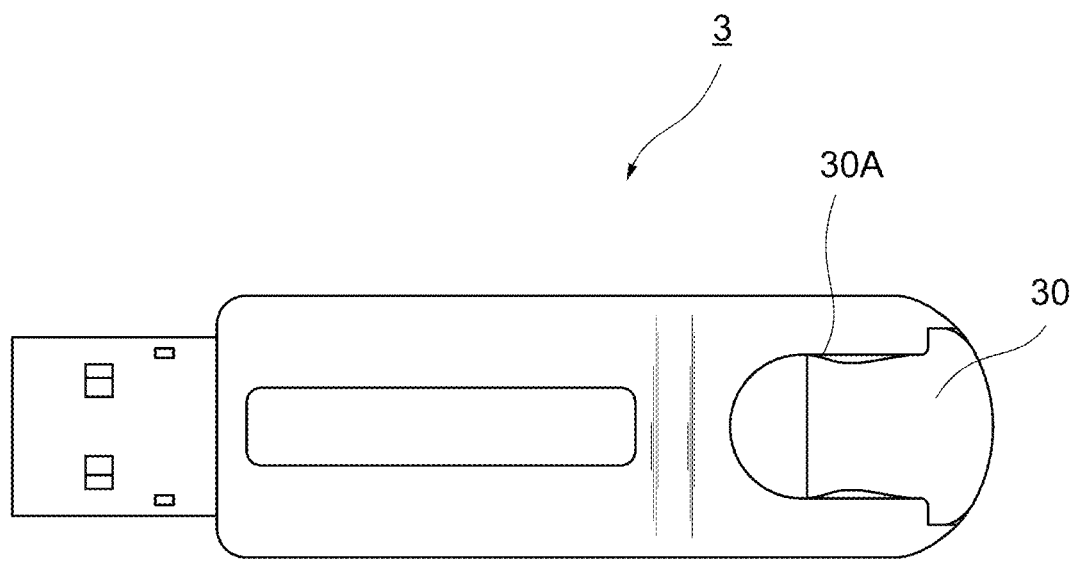
FIG. 21 is a view illustrating a charging device (a state before the power supply unit is attached) of the power supply unit of the electronic eyeglasses according to the embodiment of the present invention.
Figure 22:
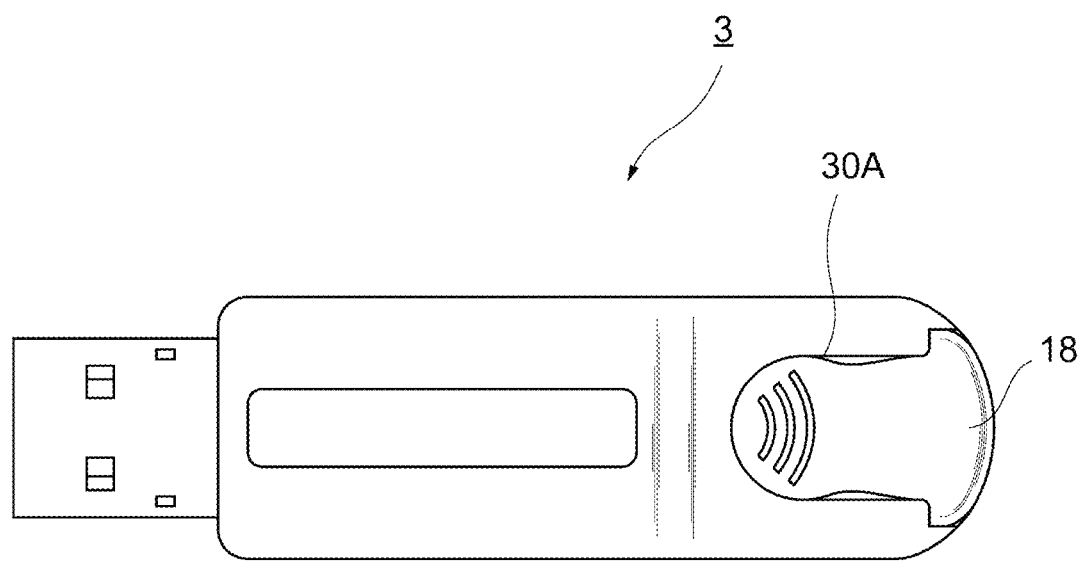
FIG. 22 is a view illustrating the charging device (a state after the power supply unit is attached) of the power supply unit of the electronic eyeglasses according to the embodiment of the present invention.

Next, with reference to FIGS. 21 and 22, a method of charging the power supply unit 18 will be described. The power supply unit 18 can be charged by being attached to a USB-type charger 3 as illustrated in FIGS. 21 and 22, for example. FIG. 21 illustrates a state of the charger 3 before the power supply unit 18 is attached, and FIG. 22 illustrates a state of the charger 3 after the power supply unit 18 is attached.

The charger 3 includes an accommodating chamber 30 formed of an elastic material (for example, plastic), and the accommodating chamber 30 is provided with a fitting portion 30A which conforms to the shape of the side surfaces of the first housing unit 182, the narrow portion 184, and the second housing unit 186 of the power supply unit 18 (that is, which has the same shape as that of the fitting portion 1620 disposed in the accommodating chamber 162 of the temple 16). In this manner, the power supply unit 18 can be smoothly inserted into and detached from the charger 3 in the same manner as when the power supply unit 18 is inserted into and detached from the temple 16. In addition, if the power supply unit 18 is once attached, the power supply unit 18 is not easily detached from the charger 3.

MODIFICATION EXAMPLE

Hitherto, the embodiments according to the present invention have been described. However, the present invention is not limited to the embodiments, and can be embodied in various aspects within the scope not departing from the gist thereof.

For example, as illustrated in FIGS. 23(A) to 23(C), a projection portion 2000 having a predetermined height (for example, approximately half height of the power supply unit 18) can be disposed between the two electrical connection terminals 180. The projection portion 2000 is disposed between the two electrical connection terminals 180 in this way. Accordingly, in a case where a liquid material (for example, user's sweat) accidentally flows into the electrical connection terminals 180, it is possible to solve a problem of short-circuiting caused by the liquid material conductive between the electrical connection terminals 180. The projection portion 2000 extends from the front end of the power supply unit 18 to the front portion on the side surface 1820 of the first housing unit 182, and is brought into contact with or fixed to the front portion of the side surface 1820. In this manner, a gap can be prevented from being formed between the first housing unit 182 and the projection portion 2000, and the liquid material can be prevented from flowing between the electrical connection terminals 180.

A shape of the projection portion 2000 may be any shape as long as the projection portion 2000 can block a portion between the two electrical connection terminals 180 as described above. For example, as illustrated in FIGS. 23(A) to 23(C), the projection portion 2000 having a substantially rectangular parallelepiped shape (rectangular shape in cross section) can be adopted. In this case, a front surface 2001 of the projection portion 2000 and two side surfaces 2002 in the width direction are substantially perpendicular to the bottom surface of the power supply unit 18, and an upper surface 2003 of the projection portion 2000 is substantially parallel to the bottom surface of the power supply unit 18. In addition, the projection portion having a semicircular shape in cross section or a polygonal shape in cross section (triangular shape, pentagonal shape, or hexagonal shape) can also be adopted.

In addition, in the above-described embodiment, an example in which the electroactive lens is used as the lens 10 has been described. However, the present invention is not limited thereto. For example, as the lens 10, various lenses such as an electrochromic lens for changing color transmission, an electrothermochromic lens for changing colors by using temperature, an anti-fogging lens for reducing cloudiness by heating the lens, an antistatic lens for eliminating dust by using electric charge, and a lens including a built-in electric display can be used. Furthermore, as the electronic eyeglasses 1, eyeglasses may be adopted which are internally equipped with a camera, a sensor, or a communication function so as to control the driving of these after receiving power supply.

In addition, for example, in the above-described embodiment, an aspect has been described in which the same one as the right power supply unit 18R is used as the left power supply unit 18L and the left power supply unit 18L is used as a backup power source. However, the present invention is not limited thereto. For example, while the left power supply unit 18L may be set to have the shape the same as the shape of the housing of the right power supply unit 18R and the rechargeable button batteries 188A and 188B may be detachable from the housing, the left power supply unit 18L may function as only the accommodating chamber for a backup battery without including the electrical connection terminal 180.

In addition, for example, the electronic element which can be electrically connected to the left power supply unit 18L may be disposed inside the left temple 16L, and the power may be supplied from the right power supply unit 18R and the left power supply unit 18L to the electronic eyeglasses 1.

In addition, for example, in the above-described embodiment, the rechargeable button batteries 188A and 188B are used as the battery accommodated in the power supply unit 18. However, without being limited thereto, a primary battery may be used, or the battery may not have a circular shape.

In addition, for example, in the above-described embodiment, an example using the USB as the charger has been described. However, without being limited thereto, a charger having a power port directly connected to an outlet plug may be used.

Figure 24:
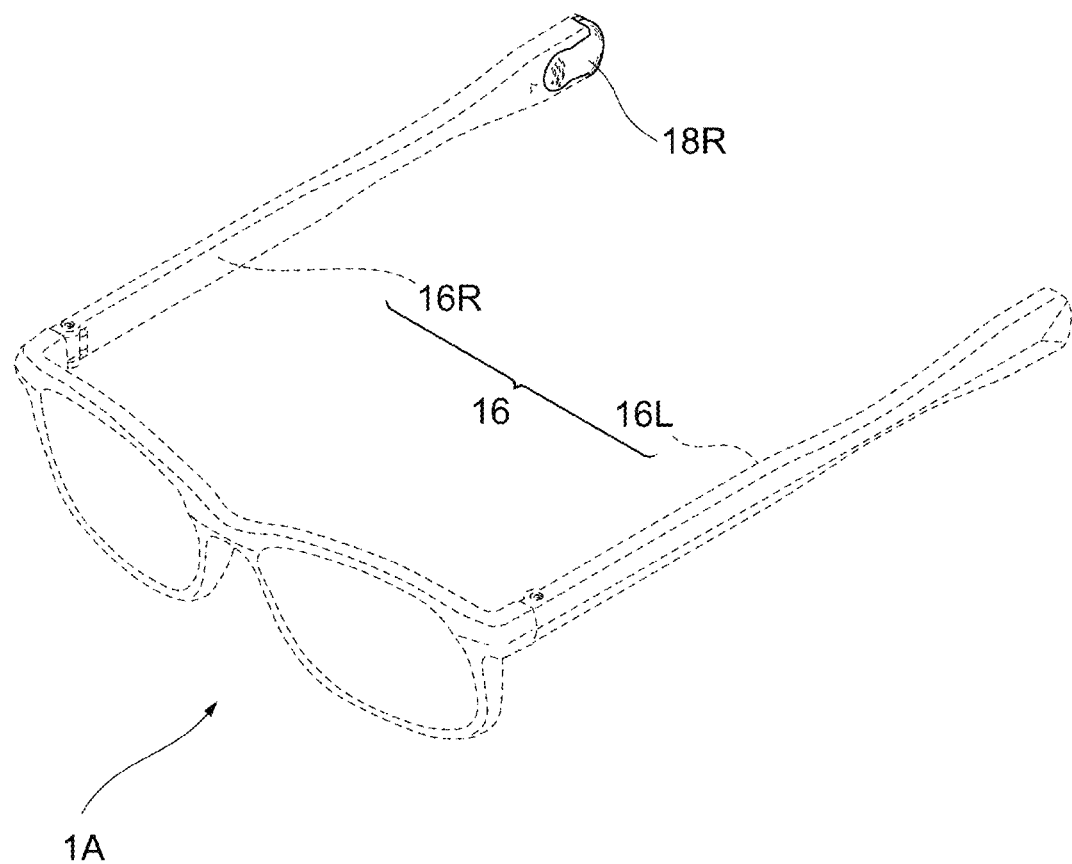
FIG. 24 is a front perspective view of the electronic eyeglasses according to another embodiment of the present invention.
Figure 25:
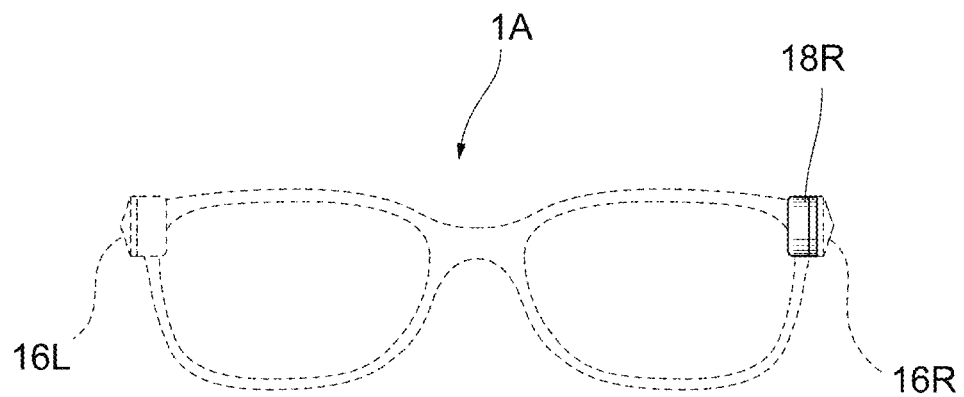
FIG. 25 is a rear view of the electronic eyeglasses according to another embodiment of the present invention.
Figure 26:
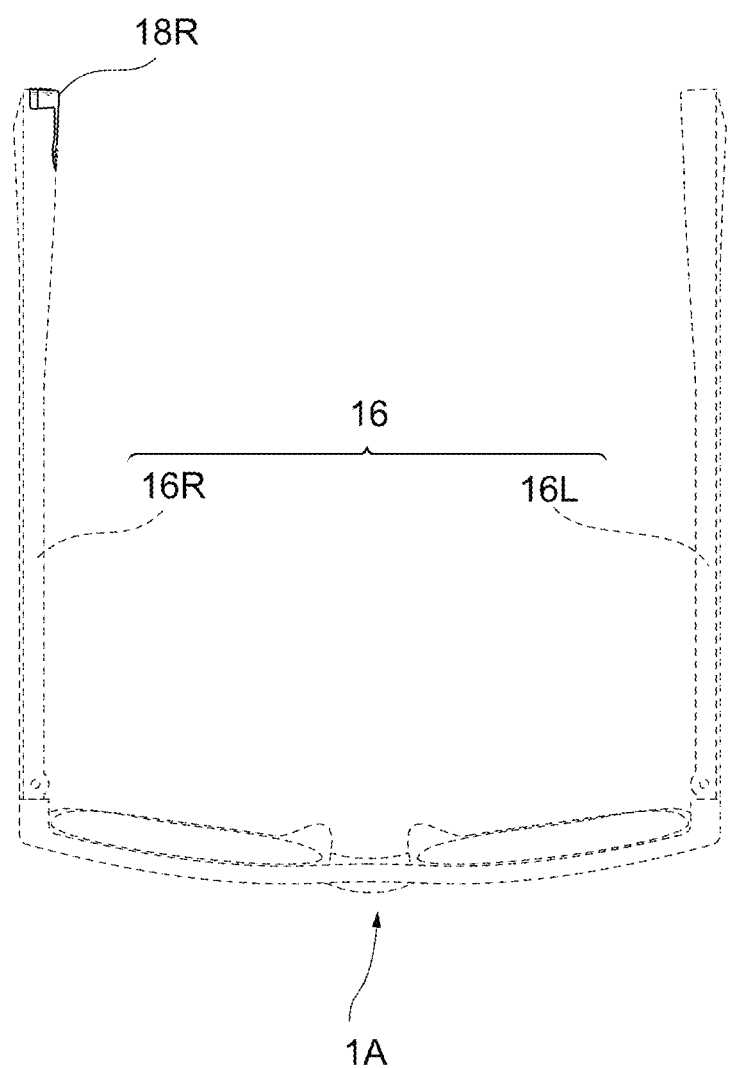
FIG. 26 is a plan view of the electronic eyeglasses according to another embodiment of the present invention.
Figure 27:
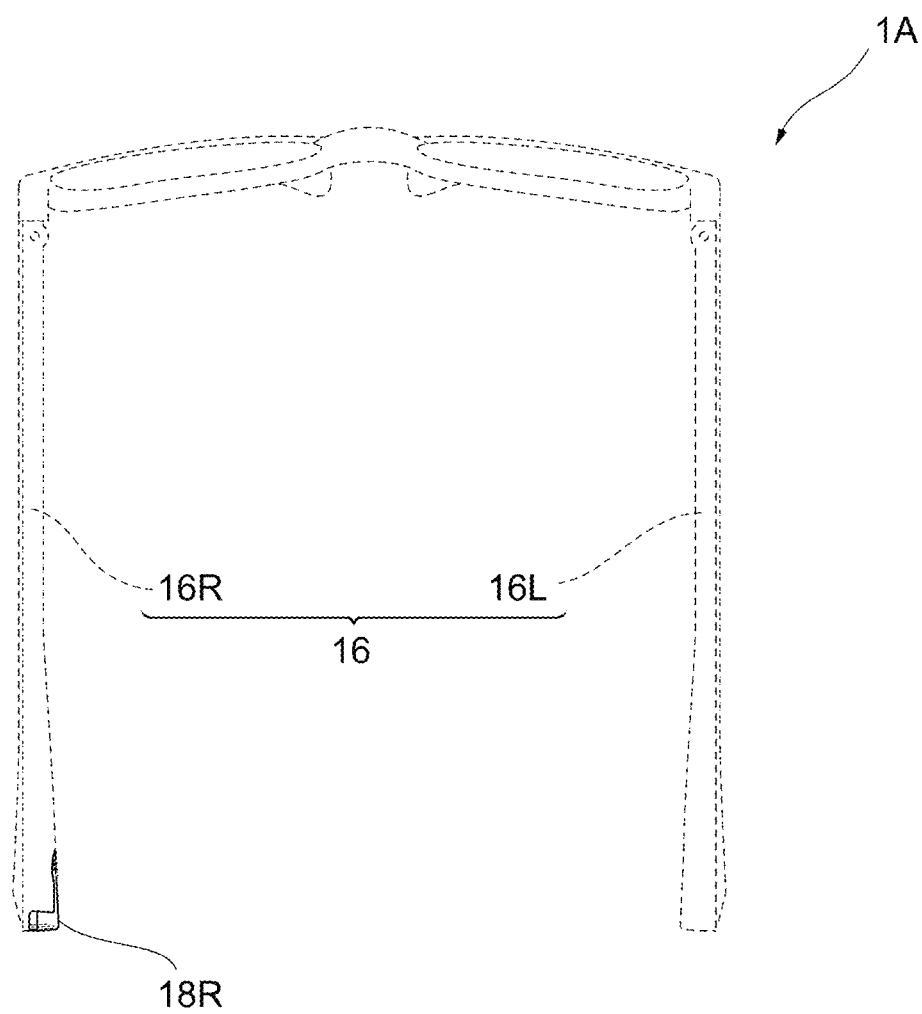
FIG. 27 is a bottom view of the electronic eyeglasses according to another embodiment of the present invention.

In addition, in the above-described embodiment, an example of adopting a structure, in which the right power supply unit 18R is attachable to the right temple 16R of the electronic eyeglasses 1 and the left power supply unit 18L is attachable to the left temple 16L of the electronic eyeglasses 1, has been described. However, a structure may be adopted in which the power supply unit is attachable to only one temple. FIGS. 24 to 27 illustrate electronic eyeglasses 1A according to another embodiment. FIG. 24 is a front perspective view, FIG. 25 is a rear view, FIG. 26 is a plan view, and FIG. 27 is a bottom view (a front view and a left side view are omitted since the views are the same as those in FIGS. 2, 6, and 7). As illustrated in FIGS. 24 to 27, a right accommodating chamber 162R to which the power supply unit 18R is attachable can be disposed in only the right temple 16R so that the accommodating chamber is not disposed in the left temple 16L.

In addition, in the above-described embodiment, the electronic eyeglasses 1 have been described as the eyewear. However, the eyewear to which the present invention is applied is not limited thereto, and may be applied to any eyewear worn by the vicinity of a user's head, ear, or eye. Examples of the eyewear include so-called eyeglasses (including the electronic eyeglasses) having an assisting mechanism for improving the vision of the user, such as the lens, and various devices having a mechanism for presenting information to the user's visual field or eye (for example, an eyeglass-type wearable terminal or a head mount display).

REFERENCE SIGNS LIST

1: electronic eyeglasses (eyewear),
10: lens,
12: frame,
14: hinge,
14A: hinge cover,
16: temple,
16L: left temple,
16R: right temple,
160: contact portion,
162: accommodating chamber (accommodating unit),
162R: right accommodating chamber,
162L: left accommodating chamber,
1620: fitting portion,
1620A: first fitting portion,
1620B: protruding portion,
1620C: second fitting portion,
18: power supply unit,
18U: power supply unit upper surface,
18D: power supply unit lower surface,
18L: left power supply unit,
18R: right power supply unit,
18Z: flat member,
180: electrical connection terminal,
181: housing unit,
182: first housing unit,
1820: side surface,
1822: projection portion,
184: narrow portion,
1840: side surface,
186: second housing unit,
1860: side surface,
1864: engaging projection,
188A: button battery,
188B: button battery,
20: electronic element,
200: control module,
202: flexible cable,
204: flexible cable,
206: power supply terminal,
2000: projection portion,
3: charger,
30: accommodating chamber,
30A: fitting portion

What is claimed is:

1. A power supply unit configured to detachably couple to an eyewear, the power supply unit comprising:
   a first housing portion defining a first interior volume;
   a second housing portion defining a second interior volume that is different than the first interior volume; and
   a narrow portion positioned between the first housing portion and the second housing portion, wherein the narrow portion is narrower than the first housing portion and the second housing portion,
   wherein at least one of the first housing portion, the second housing portion, or the narrow portion is exposed when the power supply unit is coupled to the eyewear,
   wherein a side surface of the narrow portion is located inside the power supply unit in a plan view as compared with a side surface of the first housing portion.

2. The power supply unit according to claim 1, further comprising a first battery, wherein the first housing portion is configured to hold the first battery.

3. The power supply unit according to claim 2, further comprising a second battery, wherein the second housing portion is configured to hold the second battery.

4. The power supply unit according to claim 2, wherein the first battery is a button battery.

5. The power supply unit according to claim 4, wherein a side surface of the first housing portion has an arc shape in a plan view along at least a part of a side surface of the button battery.

6. The power supply unit according to claim 1, wherein a side surface of the narrow portion is at least partly curved, and wherein the side surface is connected to a side surface of the first housing portion.

7. The power supply unit according to claim 1, wherein a thickness of the power supply unit increases from the first housing portion toward the narrow portion.

8. The power supply unit according to claim 1, wherein the first interior volume is configured to receive a first battery.

9. The power supply unit according to claim 1, further comprising an engaging projection configured to be inserted in an accommodating portion of a temple of the eyewear.

10. The power supply unit according to claim 1, further comprising an electrical connector, wherein the electrical connector is not exposed when the power supply unit is coupled to the eyewear.

11. An eyewear comprising:
   a power supply unit configured to detachably couple to the eyewear, the power supply unit comprising:
      a first housing portion defining a first interior volume;
      a second housing portion defining a second interior volume that is different than the first interior volume; and
      a narrow portion positioned between the first housing portion and the second housing portion, wherein the narrow portion is narrower than the first housing portion and the second housing portion,
      wherein at least one of the first housing portion, the second housing portion, or the narrow portion is exposed when the power supply unit is coupled to the eyewear; and
   a temple comprising, an accommodating portion configured to accommodate the power supply unit,
   wherein the accommodating portion is positioned at a distal end portion of the temple, is open to an inner surface and a back surface of the temple, and has a protruding portion that is fitted to the power supply unit,
   wherein the protruding portion is configured to elastically deform, and
   wherein when the power supply unit is inserted in the accommodating portion, the protruding portion couples to the narrow portion.

12. A power supply unit configured to detachably couple to an eyewear, the power supply unit comprising:
   a first housing portion defining a first interior volume;
   a second housing portion defining a second interior volume that is different than the first interior volume; and
   a narrow portion positioned between the first housing portion and the second housing portion, wherein the narrow portion is narrower than the first housing portion and the second housing portion, wherein at least one of the first housing portion, the second housing portion, or the narrow portion is exposed when the power supply unit is coupled to the eyewear, wherein the first interior volume is configured to receive a first battery, and wherein the second interior volume is configured to receive a second battery.

13. A power supply unit configured to detachably coupled to an eyewear, the power supply comprising:

a first housing portion;

a second housing portion;

a narrow portion positioned between the first housing portion and the second housing portion, wherein the narrow portion is narrower than the first housing portion and the second housing portion, wherein at least one of the first housing portion, the second housing portion, or the narrow portion is exposed when the power supply unit is coupled to the eyewear; and wherein a side surface of the narrow portion is located inside the power supply unit in a plan view as compared with a side surface of the first housing portion.

14. An eyewear comprising:

a power supply unit, the power supply unit comprises:

a first housing portion;

a second housing portion; and a narrow portion positioned between the first housing portion and the second housing portion, wherein the narrow portion is narrower than the first housing portion and the second housing portion; and a temple, wherein the temple has an accommodating portion configured to accommodate the power supply unit, wherein the accommodating portion is positioned at a distal end portion of the temple, is open to an inner surface and a back surface of the temple, and has a protruding portion that is fitted to the power supply unit, wherein the protruding portion is configured to elastically deform, wherein when the power supply unit is inserted in the accommodating portion, the protruding portion couples to the narrow portion, and wherein at least one of the first housing portion, the second housing portion, or the narrow portion is exposed when the power supply unit is coupled to the eyewear.

* * * * *